(12) United States Patent
Zheng et al.

(10) Patent No.: US 11,555,591 B1
(45) Date of Patent: Jan. 17, 2023

(54) PROJECTION DEVICE FOR AMBIENT DECORATION HAVING A DRIVING DEVICE CONNECTED TO A GEAR OF A REFLECTIVE MEDIUM

(71) Applicant: Shenzhen Bolong Technology Co. Ltd., Shenzhen (CN)

(72) Inventors: Huazhu Zheng, Shenzhen (CN); Yunyun Lu, Shenzhen (CN); Caijian Zheng, Shenzhen (CN); Wenzhen Ouyang, Shenzhen (CN)

( * ) Notice: Subject to any disclaimer, the term of this patent is extended or adjusted under 35 U.S.C. 154(b) by 0 days.

(21) Appl. No.: 17/858,633

(22) Filed: Jul. 6, 2022

(30) Foreign Application Priority Data

Jun. 2, 2022 (CN) .......................... 202221392587.1

(51) Int. Cl.
| | |
|---|---|
| *F21S 10/06* | (2006.01) |
| *F21V 7/04* | (2006.01) |
| *G03B 21/20* | (2006.01) |
| *F21V 5/04* | (2006.01) |
| *F21V 33/00* | (2006.01) |

(52) U.S. Cl.
CPC ............ *F21S 10/063* (2013.01); *F21V 5/046* (2013.01); *F21V 7/048* (2013.01); *F21V 33/0056* (2013.01); *G03B 21/2013* (2013.01)

(58) Field of Classification Search
CPC ...... F21V 33/0056; F21V 13/06; F21S 10/06; F21S 10/063; F21S 10/066; F21W 2121/00; F21W 2121/002; F21W 2121/004; F21W 2121/006; F21W 2121/008; F21W 2121/02; F21W 2121/04; F21W 2121/06
See application file for complete search history.

(56) References Cited

U.S. PATENT DOCUMENTS

| | | | | |
|---|---|---|---|---|
| 4,081,667 | A | * 3/1978 | Lewin | ...................... F21V 7/04 362/348 |
| 10,830,410 | B1 | 11/2020 | Wei et al. | |
| 11,156,352 | B1 | 10/2021 | Li | |
| 2008/0074279 | A1 | * 3/2008 | Chiu | ...................... F21V 14/04 340/815.45 |
| 2015/0117008 | A1 | * 4/2015 | Chen | ...................... F21V 23/00 362/249.03 |
| 2017/0045204 | A1 | * 2/2017 | McNicol | ................... F21V 7/06 |
| 2019/0078768 | A1 | 3/2019 | Altamurai et al. | |

* cited by examiner

*Primary Examiner* — Robert J May

(57) ABSTRACT

A projection device for ambient decoration may include a first light-emitting assembly comprising at least one first incoherent light source, a reflective medium, and a first driving device. The first light-emitting assembly may further include a mount recessed internally to define a placing groove adapted to the reflective medium, a first through-hole and a placing recess on one side of the first through-hole arranged at a bottom of the placing groove, a fixing column arranged in a center of the placing recess, and a second through-hole arranged at a bottom of the reflective medium. The first driving device may be coupled to the reflective medium, the fixing column may pass through the second through-hole into the reflective medium, and the at least one first incoherent light source may be connected to the fixing column.

18 Claims, 10 Drawing Sheets

PROJECTION DEVICE FOR AMBIENT DECORATION HAVING A DRIVING DEVICE CONNECTED TO A GEAR OF A REFLECTIVE MEDIUM

CROSS REFERENCE TO RELATED APPLICATION

This application claims priority benefit of Chinese invent Application No. 202221392587.1, filed on Jun. 2, 2022, and the entire contents of which are incorporated herein by reference.

TECHNICAL FIELD

The present disclosure relates to projection devices, and in particular to a projection device for ambient decoration having a driving device connected to a gear of a reflective medium.

BACKGROUND

Ambient lights, used in indoor places such as bedrooms, etc., create a starry sky and other environmental projection shape by direct projection of lamps, so as to create the corresponding atmosphere. Existing ambient projection lights, which are basically cloud-like or water ripple star lights, correspond to a single lighting effect and is easy for people to produce visual fatigue.

At the same time, the existing ambient lights use drive components to drive the movement of the light source, which produces a single light effect, and the corresponding light source circuit board is not easy to fix, easy to shake in use, leading to internal wear and tear and reducing the service life.

SUMMARY OF THE DISCLOSURE

Aiming at the above problems existing in the related art, the present disclosure provides a projection device for ambient decoration.

According to the first aspect of the present disclosure, a projection device for ambient decoration is provided. The projection device may include a first light-emitting assembly, a control assembly and an audio assembly, the first light-emitting assembly and the audio assembly respectively provided in two cavities which are capable of rotating relative to each other, the first light-emitting assembly and the audio assembly respectively electrically connected to the control assembly. The first light-emitting assembly may include at least one first incoherent light source, a reflective medium, a first condenser lens, a first driving device, a first driving gear, and a first driven gear. The first light-emitting assembly may further include a mount recessed internally to define a placing groove adapted to the reflective medium, a first through-hole and a placing recess on one side of the first through-hole arranged at a bottom of the placing groove, a fixing column arranged in a center of the placing recess, and a second through-hole arranged at a bottom of the reflective medium. The fixing column with a height higher than those of the placing recess and the second through-hole may pass through the second through-hole into the reflective medium, the first driving gear may be located in the first through-hole and connected to the first driving device, the first driven gear may be connected to the reflective medium and located in the placing recess, the at least one first incoherent light source may be connected to the fixing column, and the first condenser lens may be arranged above the reflective medium.

Typically, the projection device may further comprise an upper cavity and a lower cavity. The first light-emitting assembly may be arranged in the upper cavity. The upper cavity may be provided with a light-transmitting hole for the first condenser lens to pass through. The audio assembly may be arranged in the lower cavity. The control assembly may be arranged outside of the lower cavity. The upper cavity may be connected to the lower cavity by a magnetic adsorption.

Typically, a bottom of the upper cavity may be provided with a long iron piece. Atop of the lower cavity may be provided with at least one magnet. The upper cavity may be adapted to cling to the lower cavity by the magnetic adsorption when the bottom of the upper cavity is close to the top of the lower cavity.

Typically, the projection device may further comprise a third cavity. The control assembly may be arranged in the third cavity. The control assembly may comprise a control circuit board arranged in the third cavity and a button assembly electrically connected to the control circuit board.

Typically, the audio assembly may comprise a speaker. An audio control module may be arranged on the control circuit board. The speaker may be electrically connected to the audio control module.

Typically, the first light-emitting assembly may further comprise a fixing ring pressing the first condenser lens onto the mount.

Typically, an exterior of the upper cavity corresponding to a location of the first condenser lens may be provided with a light-transmitting protective cover.

Typically, the upper cavity may be in a shape of a dog's head, the lower cavity may be in a shape of the dog's body in a sitting position, and the third cavity may be in a shape of a backpack.

Typically, the projection device may further comprise a laser assembly. The laser assembly may comprise at least one coherent light source and at least one diffraction medium. The at least one diffraction medium may be arranged above the at least one coherent light source. The at least one coherent light source may irradiate towards the at least one diffraction medium.

According to the second aspect of the present disclosure, a projection device for ambient decoration is provided. The projection device may include a first light-emitting assembly. The first light-emitting assembly may include at least one first incoherent light source, a reflective medium, a first condenser lens, a first driving device, a first driving gear, and a first driven gear. The first light-emitting assembly may further include a mount recessed internally to define a placing groove adapted to the reflective medium, a first through-hole and a placing recess on one side of the first through-hole arranged at a bottom of the placing groove, a fixing column arranged in a center of the placing recess, and a second through-hole arranged at a bottom of the reflective medium. The fixing column with a height higher than those of the placing recess and the second through-hole may pass through the second through-hole into the reflective medium, the first driving gear may be located in the first through-hole and connected to the first driving device, the first driven gear may be connected to the reflective medium and located in the placing recess, the at least one first incoherent light source may be connected to the fixing column, and the first condenser lens may be arranged above the reflective medium.

Typically, the reflective medium may be hemispherical. The first driven gear and the reflective medium may be integrally formed. The first driven gear may be arranged at a bottom center of the reflective medium.

Typically, a periphery of the placing recess may be provided with a surrounding wall.

Typically, an upper end of the fixing column may be provided with a limit protrusion. Each of the at least one first incoherent light source may comprise a lamp board and at least one lamp bead arranged on the lamp board. The lamp board may be opened with an assembly hole adapted to the limit protrusion. The lamp board may be fixed on the fixing column through the assembly hole and the limit protrusion. The lamp board may be locked by at least one screw.

Typically, the projection device may further comprise a laser assembly. The laser assembly may comprise at least one coherent light source and at least one diffraction medium. The at least one diffraction medium may be arranged above the at least one coherent light source. The at least one coherent light source may irradiate towards the at least one diffraction medium.

According to the third aspect of the present disclosure, a projection device for ambient decoration is provided. The projection device may include a first light-emitting assembly. The first light-emitting assembly may include at least one first incoherent light source, a reflective medium, and a first driving device. An inner surface of the reflective medium may consist of a plurality of irregular reflective surfaces connected to each other. A quantity of the reflective surfaces may be 12 or more. The first light-emitting assembly may further include a mount recessed internally to define a placing groove adapted to the reflective medium, a first through-hole and a placing recess on one side of the first through-hole arranged at a bottom of the placing groove, a fixing column arranged in a center of the placing recess, and a second through-hole arranged at a bottom of the reflective medium. The first driving device may be arranged in the first through-hole and drivingly connected with the reflective medium, the fixing column may pass through the second through-hole into the reflective medium, and the at least one first incoherent light source may be connected to the fixing column.

Typically, a first condenser lens may be arranged above the first light-emitting assembly. The at least one first incoherent light source may horizontally irradiate the reflective medium. Light from the at least one first incoherent light source may be reflected by the reflective medium to the first condenser lens and then refracted by the first condenser lens and then emitted.

Typically, the projection device may further comprise a second light-emitting assembly comprising at least one second incoherent light source, a projection base, a second condenser lens, a film sheet and a film sheet pad. The second condenser lens, the film sheet and the film sheet pad may be arranged in the projection base. The projection base may be provided with a third through-hole. The at least one second incoherent light source may pass through the third through-hole. The second condenser lens may be arranged above the at least one second incoherent light source. The film sheet may be arranged above the second condenser lens by the film sheet pad.

Typically, the projection device may further comprise a laser assembly. The laser assembly may comprise at least one coherent light source and at least one diffraction medium. The at least one diffraction medium may be arranged above the at least one coherent light source. The at least one coherent light source may irradiate towards the at least one diffraction medium.

Typically, the projection device may further comprise a second driving assembly configured to drive a movement of the laser assembly.

Typically, the projection device may further comprise a second driving gear connected to the second driving assembly and a second driven gear connected to the at least one diffraction medium. The second driving assembly may be configured to drive the at least one diffraction medium based on cooperation of the second driving gear and the second driven gear.

The present disclosure can use the mount to place the reflective medium. The first driving gear and the first driven gear can be limited and fixed by the first through-hole and the placing recess in the mount respectively. The first driving device is configured to drive the reflective medium to rotate in the mount through cooperation of the first driving gear and the first driven gear. The at least one first incoherent light source can be arranged in the reflective medium through the fixing column. The light reflected by the reflective medium can continuously move and change when the first driving device drives the reflective medium to rotate, presenting a lighting effect similar to dynamic water ripple. The at least one first incoherent light source not rotating and the setting of the mount can ensure that the entire first light-emitting assembly is compact and not loose, which can ensure the life of the projection device. The projection device comprising the first light-emitting assembly may have a simple and compact structure, which effectively improves the diversity of lighting effects of the projection device and ensures the life of the projection device.

BRIEF DESCRIPTION OF THE DRAWINGS

In order to illustrate technical solutions of the embodiments of the present disclosure clearly, accompanying drawings for describing the embodiments will be introduced in brief. Obviously, the drawings in the following description are only some embodiments of the present disclosure. For the person of ordinary skill in the art, other drawings may be obtained based on the provided drawings without any creative work, wherein.

LIST OF REFERENCE NUMERALS

Figure 1:
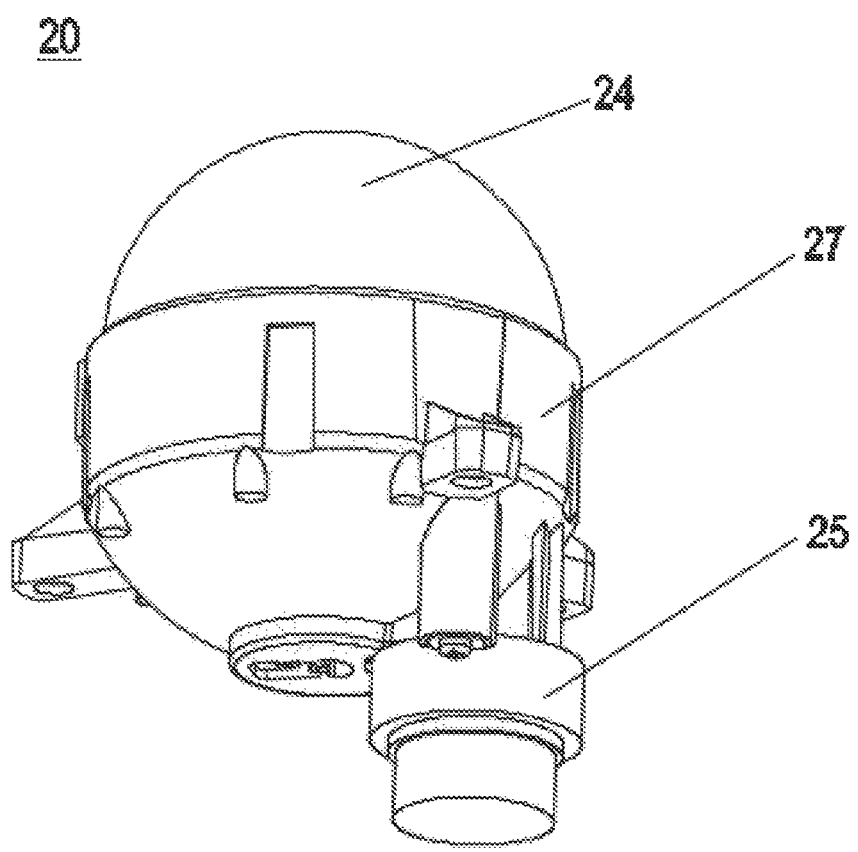
FIG. 1 is a schematic view of a first light-emitting assembly of a projection device for ambient decoration according to a first embodiment of the present disclosure.
Figure 2:
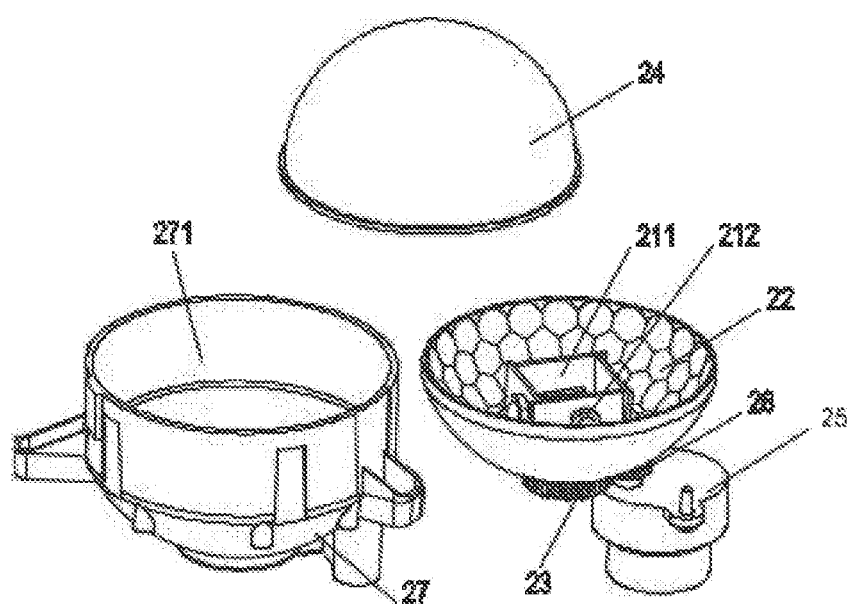
FIG. 2 is an exploded view of the first light-emitting assembly of FIG. 1.
Figure 3:
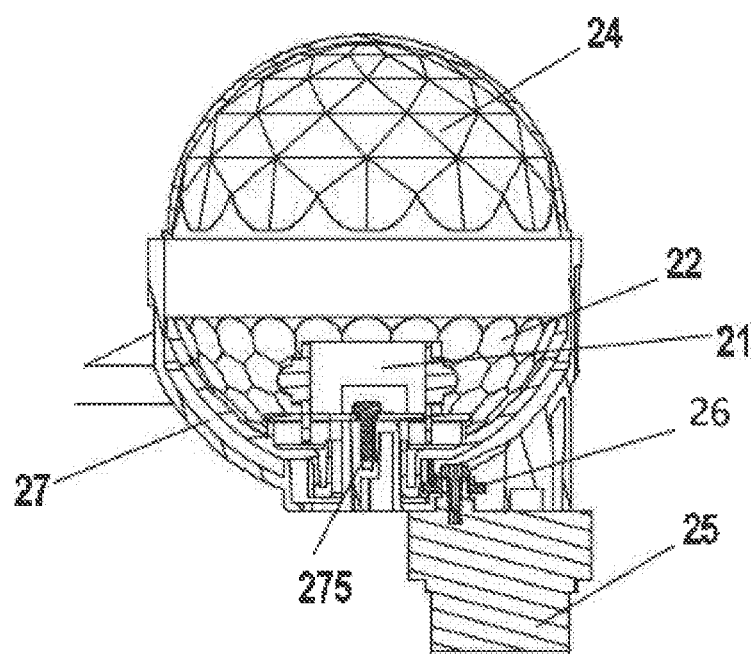
FIG. 3 is a cross-sectional view of the first light-emitting assembly of FIG. 1.
Figure 4:
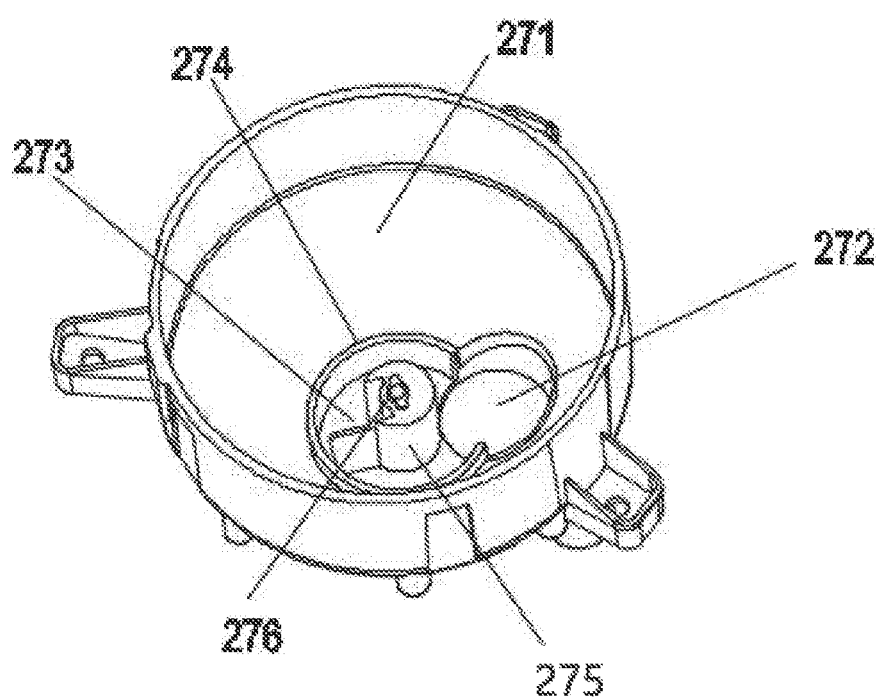
FIG. 4 is a schematic view of the mount of FIG. 1.
Figure 5:
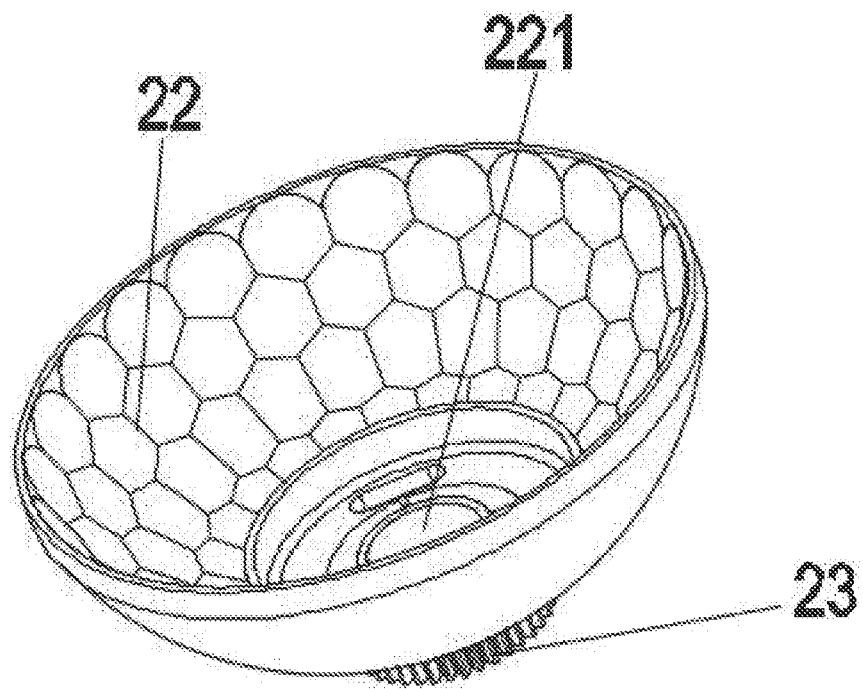
FIG. 5 is a schematic view of the reflective medium of FIG. 1.

First light-emitting assembly 20; first incoherent light source 21; lamp board 211; lamp bead 212; reflective medium 22; second through-hole 221; first driven gear 23; first condenser lens 24; first driving device 25; first driving gear 26; mount 27; placing groove 271; first through-hole 272; placing recess 273; surrounding wall 274; fixing column 275; limit protrusion 276; laser assembly 30; coherent light source 31; diffraction medium 32; heat sink 33; second driving assembly 34; second driving gear 35; second driven gear 36; control assembly 40; second light-emitting assembly 60; second incoherent light source 41; projection base 42; second condenser lens 43; film sheet 44; film sheet pad 45; upper cavity 101; lower cavity 102; third cavity 103; fixing ring 104; long iron piece 105; audio assembly 50; light output hole 52; light-transmitting protective cover 53.

DETAILED DESCRIPTION

The present disclosure will be described clearly and thoroughly herein by accompanying with appended figures of some embodiments. Apparently, the embodiments are only part of the present disclosure, and are not the whole disclosure. For the person of ordinary skill in the art, other embodiments may be obtained based on the provided embodiments without any creative work, and the other embodiments are also covered by the present disclosure.

The embodiments are described with reference to the accompanying drawings, in order to illustrate specific embodiments of the present disclosure that can be implemented. In the specification, it can be understood that, directional terms recited in the present disclosure, such as "top", "bottom", "upper", "lower". "front", "rear", "left", "right", "above", "under", and the like, only explain the relative positional relationship, motion, etc. between the various elements under a specific posture (as shown in the accompanying drawings). If the specific posture changes, the directional terms will change accordingly. Thus, the directional terms used here are only for better and more clearly describing and understanding the present disclosure, and are not intended to indicate or imply that the devices or the elements are disposed to locate at the specific directions or are structured and performed in the specific directions, which could not to be understood as limiting the present disclosure.

In addition, terms such as "first", "second", "third", and the like are used herein for purposes of description, and are not intended to indicate or imply relative importance or significance or to imply the number of indicated technical features. Thus, the feature defined with "first", "second", "third", and the like may include one or more of such a feature. Further, when "and/or" appears throughout the present disclosure, it means three concurrent solutions are included. For example. "A and/or B" includes solution A, or solution B. or a solution satisfying both A and B. Moreover, the embodiments and the features recited in the embodiments of the present disclosure may be combined with each other without confliction. However, the combination must be based on the ability of realization by the person of ordinary skill in the art. When a combination is contradictory or cannot be realized, it should be considered that such combination does not exist and is not within the scope of protection claimed by the present disclosure.

First Embodiment

Referring to FIGS. 1-5, 9 and 10, a projection device for ambient decoration according to the present embodiment may include a first light-emitting assembly 20. The first light-emitting assembly 20 can be a light-emitting device configured to project light with the effect similar to water ripple in the projection device for ambient decoration.

The first light-emitting assembly 20 may include at least one first incoherent light source 21, a reflective medium 22, a first condenser lens 24, a first driving device 25, a first driving gear 26, and a first driven gear 23. The first condenser lens 24 may be arranged above the reflective medium 22.

The first light-emitting assembly 20 may further include a mount 27. The mount 27 can be recessed internally to define a placing groove 271 adapted to the reflective medium 22. A bottom of the placing groove 271 can be provided with a first through-hole 272 and a placing recess 273 on one side of the first through-hole 272. The first driving gear 26 may be located in the first through-hole 272 and connected to a drive shaft of the first driving device 25. The first driven gear 23 may be located in the placing recess 273 and connected to the reflective medium 22. The first driving device 25 can be configured to drive the movement of the reflective medium 22 through the engagement of the first driving gear 26 and the first driven gear 23, so as to create a lighting effect similar to dynamic water ripple.

Typically, a periphery of the placing recess 273 may be provided with a surrounding wall 274. The surrounding wall 274 is capable of preventing displacement of the first driven gear 23 while preventing other substances from affecting the operation of the first driven gear 23.

A center of the placing recess 273 can be provided with a fixing column 275. A bottom of the reflective medium 22 can be provided with a second through-hole 221. The fixing column 275 may pass through the second through-hole 221 into the reflective medium 22. The height of the fixing column 275 can be higher than the height of the placing recess 273 and the height of the second through-hole 221. The at least one first incoherent light source 21 may be connected to the fixing column 275. The at least one first incoherent light source 21 may be fixed by the fixing column 275 passing through the second through-hole 221. The at least one first incoherent light source 21 can be arranged in the reflective medium 22 with a location near the center of the reflective medium 22, so that the reflective medium 22 can reflect the light emitted from the first incoherent light source 21 evenly. The light emitted from the at least one first incoherent light source 21 can be transmitted to the reflective medium 22 for reflection, and finally emitted after refracted by the first condenser lens 24, which can effectively increase the irradiation range of the light. Meanwhile, the height of the fixing column 275 is higher than those of the placing recess 273 and the second through-hole 271, thus the reflective medium 22 will not rub with the at least one first incoherent light source 21 when rotating.

The first incoherent light source 21 can be configured to emit light. The first incoherent light source 21 may be an LED light source, a super luminescent light emitting diode or a broadband light source, without limitation herein. A quantity of the first incoherent light source 21 can be one or more to enhance the luminous intensity of the projection device. The first incoherent light source 21 may each include a lamp board 211 and at least one lamp bead 212 arranged on the lamp board 211. A luminous surface of each lamp bead 212 is arranged toward the reflective medium 22.

The reflective medium 22 can be configured to reflect light from the first incoherent light source 2. An inner surface of the reflective medium 22 may consist of a plurality of irregular reflective surfaces connected to each other. A quantity of the reflective surfaces may be 12 or more. Typically, the inner surface of the reflective medium 22 may be hemispherical, thus light reflected from the reflective medium 22 can have the lighting effect similar to dynamic water ripple. The reflective medium 22 may also be trapezoidal or elliptical, etc. . . . The first driven gear 23 can be integrally formed with the reflective medium 22 and arranged at a bottom center of the reflective medium 22, i.e., under the fixing column 275.

Typically, an upper end of the fixing column 275 may be provided with a limit protrusion 276. The lamp board 211 may be opened with an assembly hole adapted to the limit protrusion 276. The lamp board 211 may be fixed on the fixing column 275 through the assembly hole and the limit protrusion 276. The lamp board 211 may be locked by at least one screw. The matching of the limit protrusion 276 and the assembly hole can facilitate the fixing of the light board 211, and then the light board 211 can be fixed to the fixing column 275 with the at least one screw. In other embodiments, the corresponding limit protrusion 276 can be omitted, and the fixing column 275 can be directly locked to the light board 211 by the at least one screw.

The first light-emitting assembly 20 can be configured to use the light emitted from the lamp bead 212 and reflected by the reflective medium 22 and then refracted out by the first condenser lens 24, while the reflective medium 22 can be rotated under the action of the first driving device 25 to achieve the effect of movable water ripple which can greatly improve the projection interest. The corresponding first incoherent light source 21 not rotating and the setting of the mount 27 can ensure that the entire first light-emitting assembly 20 is compact and not loose, which can ensure the life of the projection device.

The projection device for ambient decoration may further include a control assembly 40 electrically connected to the first light-emitting assembly 20. The control assembly 40 can be configured to control open and close of the first light-emitting assembly 20 and provide electric power for the first light-emitting assembly 20.

Second Embodiment

Figure 6:
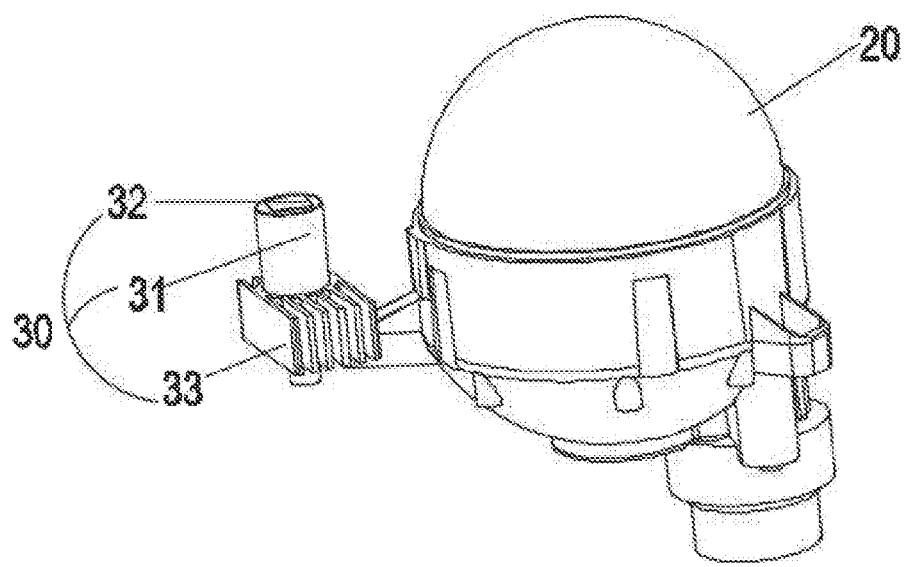
FIG. 6 is a schematic view of a projection device for ambient decoration according to a second embodiment of the present disclosure.

Referring to FIG. 6, the projection device for ambient decoration according to the present embodiment may further include a laser assembly 30 in addition to the first light-emitting assembly 20. The laser assembly 30 can be electrically connected to the control assembly 40 and configured to create bright spots to form a star-like effect. Typically, the laser assembly 30 may include at least one coherent light source 31 and at least one diffraction medium 32. The at least one diffraction medium 32 may be arranged above the at least one coherent light source 31. The at least one coherent light source 31 may irradiate towards the at least one diffraction medium 32. According to the present embodiment, the laser assembly 30 can be another light-emitting device in the projection device for ambient decoration and typically arranged on one side of the first light-emitting assembly 20. A heat sink 33 can be provided on the outside of the at least one coherent light source 31 for heat dissipation of the laser assembly 30. A light output hole 52 can be provided on an upper cavity 101 according to the location of the laser assembly 30. The diffraction medium 32 can be configured to diffract the light emitted from the coherent light source 31 to form a diffracted beam, so as to present another lighting effect of the projection device.

Figure 7:
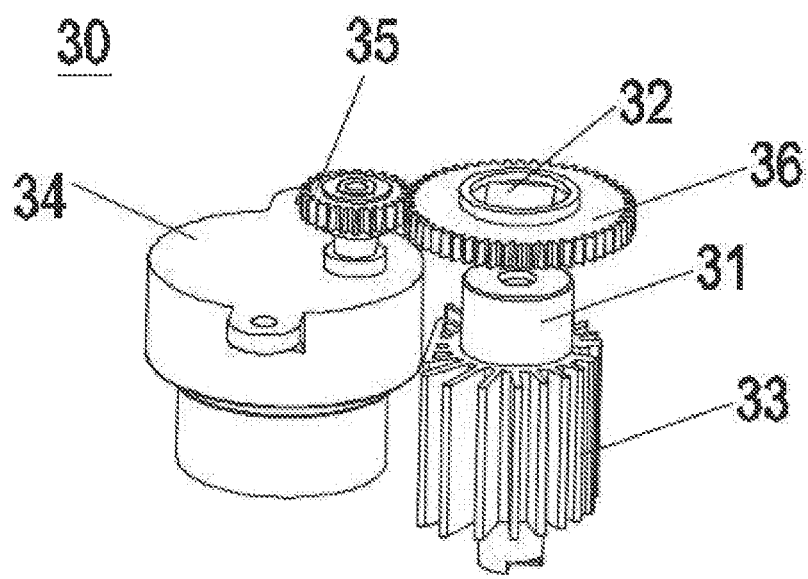
FIG. 7 is a schematic view of the laser assembly of FIG. 6.
Figure 8:
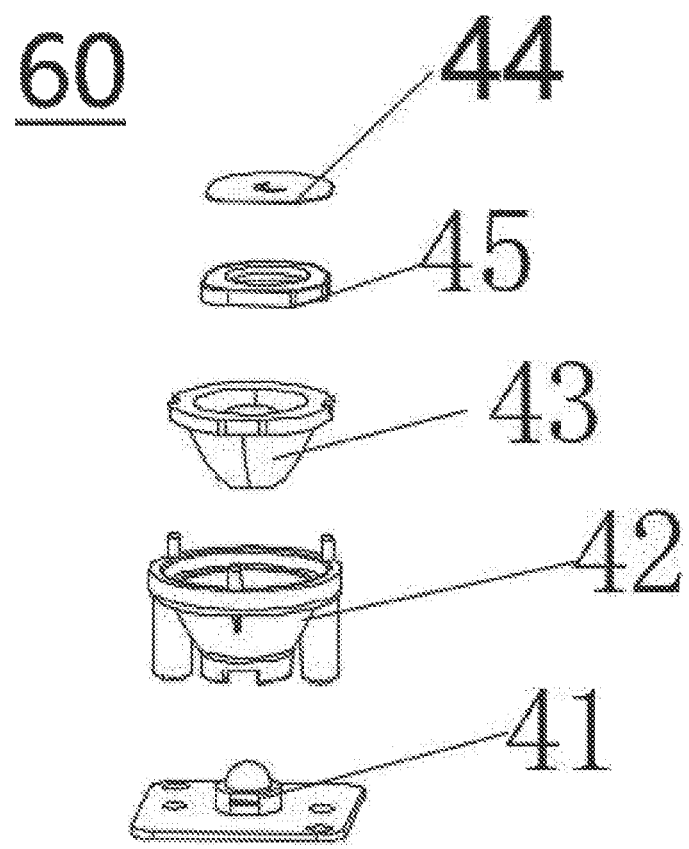
FIG. 8 is a schematic view of a second light-emitting assembly of a projection device for ambient decoration according to a third embodiment of the present disclosure.

Referring to FIG. 7, the laser asassembly 30 can be moveable in one scenario. The projection device for ambient decoration may further include a second driving assembly 34 configured to drive a movement of the laser assembly 30. Typically, the diffraction medium 32 of the laser assembly 30 may be directly connected to a drive shaft of the second driving assembly 34. Alternatively, the projection device may further comprise a second driving gear 35 connected to the second driving assembly 34 and a second driven gear 36 connected to the at least one diffraction medium 32. The second driving assembly 34 may be configured to drive the at least one diffraction medium 32 based on cooperation of the second driving gear 35 and the second driven gear 36.

Third Embodiment

Referring to FIG. 7, the third embodiment of the present disclosure is a further extension of the second embodiment. Compared to the second embodiment, the projection device for ambient decoration according to the present embodiment may further include a second light-emitting assembly 60 electrically connected to the control assembly 40.

Typically, the second light-emitting assembly 60 can include at least one second incoherent light source 41, a projection base 42, a second condenser lens 43, a film sheet 44 and a film sheet pad 45. The second condenser lens 43, the film sheet 44 and the film sheet pad 45 may be arranged in the projection base 42. The projection base 42 may be provided with a third through-hole. The at least one second incoherent light source 41 may pass through the third through-hole. The second condenser lens 43 may be arranged above the at least one second incoherent light source 41. The film sheet 44 may be arranged above the second condenser lens 43 by the film sheet pad 45.

According to the present embodiment, the second light-emitting assembly 60 can be another light-emitting device in the projection device for ambient decoration having a lighting mode different from the first light-emitting assembly 20 and the laser assembly 30. The second light-emitting assembly 60 can be configured to project the picture of the film sheet 44 by the second condenser lens 43, and different projection effects can be presented by changing the pattern of the film sheet 44.

Fourth Embodiment

Figure 9:
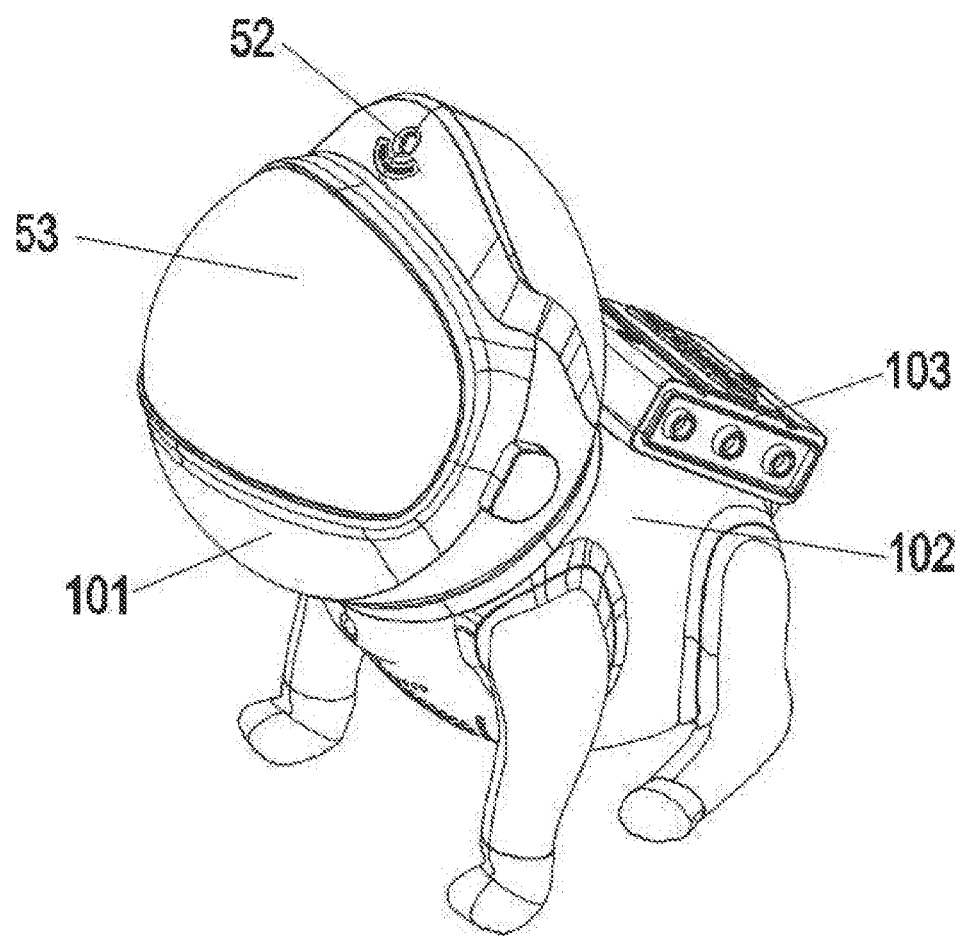
FIG. 9 is a schematic view of a projection device for ambient decoration according to a fourth embodiment of the present disclosure.
Figure 10:
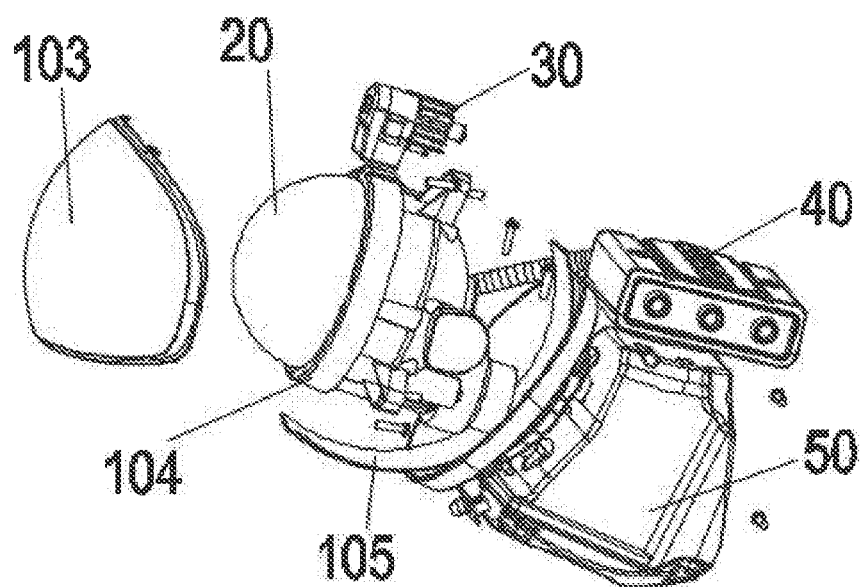
FIG. 10 is a partial schematic view of FIG. 9 omitting shells.

Referring to FIGS. 9 and 10, the fourth embodiment of the present disclosure is a further extension of the first embodiment, wherein FIG. 9 is a schematic view of a projection device for ambient decoration according to a fourth embodiment of the present disclosure and FIG. 10 is a partial schematic view of FIG. 9 omitting shells.

Typically, the projection device according to the present embodiment may further include an audio assembly 50. The first light-emitting assembly 20 can be configured to present a lighting effect similar to dynamic water ripple. The first light-emitting assembly 20 and the audio assembly 50 can be respectively provided in two cavities which are capable of rotating relative to each other. The first light-emitting assembly 20 and the audio assembly 50 may be respectively electrically connected to the control assembly 40 and work based on the control of the control assembly 40.

Specifically, the principle and structure of the first light-emitting assembly 20 according to the present embodiment can be the same as the first embodiment of the present disclosure and will not be repeated.

Typically, the projection device may further comprise an upper cavity 101 and a lower cavity 102. The upper cavity 101 and the lower cavity 102 can be enclosed by different shells respectively. The first light-emitting assembly 20 may be arranged in the upper cavity 101. The audio assembly 50 may be arranged in the lower cavity 102. The control assembly 40 may be arranged outside of the lower cavity 102. The upper cavity 101 may be provided with a light-transmitting hole for the first condenser lens 24 to pass through. At least part of the first condenser lens 24 can pass through the light-transmitting hole to ensure that the refracted light can be projected out.

Typically, the first light-emitting assembly 20 may further comprise a fixing ring 104. The fixing ring 104 can be configured to press the first condenser lens 24 onto the mount 27, so that the first condenser lens 24 can be fixed relative to the reflective medium 22 and a fixing for the first condenser lens 24 can be formed. Meanwhile, an exterior of the upper cavity 101 corresponding to a location of the first condenser lens 24 may be provided with a light-transmitting protective cover 53. The light-transmitting protective cover 53 can be configured to protect the first condenser lens 24 to prevent direct contact with the first condenser lens 24 during use and affecting the projection effect.

According to the present embodiment, the upper cavity 101 and the lower cavity 102 are capable of rotating relative to each other. An end of the lower cavity 102 connecting the upper cavity 101 can be provided with a housing slot for the upper cavity 101, so that the two cavities can be aesthetically pleasing and easily rotated.

Typically, the upper cavity 101 may be connected to the lower cavity 102 by a magnetic adsorption. A bottom of the upper cavity 101 may be provided with a long iron piece 105. Atop of the lower cavity 102 may be provided with at least one magnet. The upper cavity 101 may be adapted to cling to the lower cavity 102 by the magnetic adsorption when the bottom of the upper cavity 101 is close to the top of the lower cavity 102. Alternatively, corresponding iron piece arranged in the lower cavity 102 and at least one magnet arranged in the upper cavity 101 can be magnetic adsorbed to each other.

In other embodiments, the relative rotating of the upper cavity 101 and the lower cavity 102 can be realized by a snap connection, or a pivot shaft, etc., which can achieve a relative rotation connection between the upper cavity 101 and the lower cavity 102.

Typically, the projection device may further comprise a third cavity 103. The control assembly 40 may be arranged in the third cavity 103. The control assembly 40 may comprise a control circuit board and a button assembly, wherein the control assembly 40 can be connected to the first light-emitting assembly 20 and the audio assembly 50 respectively through conductive wires. The audio assembly 50 may include a speaker. An audio control module may be arranged on the control circuit board. The speaker may be electrically connected to the audio control module. The speaker can be provided in the lower cavity 102 typically with an opening facing the bottom, and at least one sound-permeable hole can be opened at the bottom of the lower cavity 102, so that the projection device can have an aesthetic appearance.

The first light-emitting assembly 20, the audio assembly 50 and the control assembly 40 can be placed respectively utilizing the upper cavity 101, the lower cavity 102 and the third cavity 103 which are separately arranged. The corresponding cavity can be adjusted individually in subsequent maintenance. Meanwhile, the two cavities capable of rotating relatively to each other can realize the projection angle adjustment of the first light-emitting assembly 20 to increase the interest of the projection device.

Typically, the projection device can be in a shape of a dog in a sitting position. The upper cavity of the projection device may be in a shape of the dog's head, the lower cavity may be in a shape of the dog's body, and the third cavity 103 may be in a shape of a backpack. Projection angle adjustment can be achieved by magnetic connection between the upper cavity 101 and the lower cavity 102.

The projection device according to the present embodiment may further include a laser assembly 30. The principle and structure of the laser assembly 30 can be the same as the second embodiment of the present disclosure and will not be repeated.

According to the present embodiment, the laser assembly 30 can be another light-emitting device in the projection device and typically arranged on one side of the first light-emitting assembly 20. The light exit hole can be provided on the upper cavity 101 correspondingly. The diffraction medium 32 can be arranged in the light exit hole and configured to diffract the light emitted from the coherent light source 31 to form a diffracted beam, so as to present another lighting effect of the projection device.

Typically, the laser assembly 30 can be arranged above the upper cavity 101, e.g., in a cap-shaped housing, under the circumstance that the projection device is in the shape of the dog in the sitting position.

In other embodiments of the present disclosure, the projection device can be in a shape of a kitten, wherein the first light-emitting assembly 20 can be arranged on the head of the kitten, the laser assembly 30 can be synchronously arranged on the head of the kitten or on the nose of the kitten, etc., all of which should be within the protection scope of the present disclosure.

Fifth Embodiment

The difference between the present embodiment and the fourth embodiment is that the first light-emitting assembly 20, the audio assembly 50 and the control assembly 40 may be arranged in a cavity formed by the same shell, which can be an exterior shell of the projection device and configured to provide mounting positions for and protect other parts of the projection device. The overall shape of the shell can be spherical or saucer-shaped, etc. without specific limitations.

For one skilled in the art, it is clear that the present disclosure is not limited to the details of the above exemplary embodiments, and that the present disclosure can be implemented in other specific forms without deviating from the spirit or basic characteristics of the application. Therefore, at any point, the embodiments should be regarded as exemplary and unrestrictive, and the scope of the present application is defined by the appended claims, rather than the above description. Therefore, all changes within the meaning and scope of the equivalent elements of the claim or directly/indirectly utilization in other related technical fields are intended to be included in protection scope of the present disclosure. Any appended label recited in the claims shall not be regarded as a limitation to the claims.

What is claimed is:

1. A projection device for ambient decoration, comprising:
   a first light-emitting assembly,
   a control assembly, and
   an audio assembly, the first light-emitting assembly and the audio assembly respectively provided in an upper cavity and a lower cavity which are capable of rotating relative to each other, the first light-emitting assembly and the audio assembly respectively electrically connected to the control assembly;
   the first light-emitting assembly comprising at least one first incoherent light source, a reflective medium, a first condenser lens, a first driving device, a first driving gear, and a first driven gear;
   the first light-emitting assembly further comprising a mount recessed internally to define a placing groove adapted to the reflective medium, a first through-hole and a placing recess on one side of the first through-hole arranged at a bottom of the placing groove, a fixing column arranged in a center of the placing recess, and a second through-hole arranged at a bottom of the reflective medium, wherein the fixing column with a height higher than those of the placing recess and the second through-hole passes through the second through-hole into the reflective medium, the first driving gear is located in the first through-hole and connected to the first driving device, the first driven gear is connected to the reflective medium and located in the placing recess, the at least one first incoherent light source is connected to the fixing column, and the first condenser lens is arranged above the reflective medium.

2. The projection device of claim 1, wherein the first light-emitting assembly is arranged in the upper cavity, the upper cavity is provided with a light-transmitting hole for the first condenser lens to pass through, the audio assembly is arranged in the lower cavity, the control assembly is arranged outside of the lower cavity, and the upper cavity is connected to the lower cavity by a magnetic adsorption.

3. The projection device of claim 2, wherein a bottom of the upper cavity is provided with an iron piece, a top of the lower cavity is provided with at least one magnet; and the upper cavity is adapted to cling to the lower cavity by the magnetic adsorption when the bottom of the upper cavity is close to the top of the lower cavity.

4. The projection device of claim 3, wherein the projection device further comprises a third cavity, the control assembly is arranged in the third cavity, and the control assembly comprises a control circuit board arranged in the third cavity and a button assembly electrically connected to the control circuit board.

5. The projection device of claim 4, wherein the audio assembly comprises a speaker, an audio control module is arranged on the control circuit board, and the speaker is electrically connected to the audio control module.

6. The projection device of claim 4, wherein the first light-emitting assembly further comprises a fixing ring pressing the first condenser lens onto the mount.

7. The projection device of claim 6, wherein an exterior of the upper cavity corresponding to a location of the first condenser lens is provided with a light-transmitting protective cover.

8. The projection device of claim 4, wherein the upper cavity is in a shape of a dog's head, the lower cavity is in a shape of the dog's body in a sitting position, and the third cavity is in a shape of a backpack.

9. The projection device of claim 1, wherein the projection device further comprises a laser assembly, the laser assembly comprises at least one coherent light source and at least one diffraction medium, the at least one diffraction medium is arranged above the at least one coherent light source, and the at least one coherent light source irradiates towards the at least one diffraction medium.

10. A projection device for ambient decoration, comprising a first light-emitting assembly;
   the first light-emitting assembly comprising at least one first incoherent light source, a reflective medium, a first condenser lens, a first driving device, a first driving gear, and a first driven gear;
   the first light-emitting assembly further comprising a mount recessed internally to define a placing groove adapted to the reflective medium, a first through-hole and a placing recess on one side of the first through-hole arranged at a bottom of the placing groove, a fixing column arranged in a center of the placing recess, and a second through-hole arranged at a bottom of the reflective medium, wherein the fixing column with a height higher than those of the placing recess and the second through-hole passes through the second through-hole into the reflective medium, the first driving gear is located in the first through-hole and connected to the first driving device, the first driven gear is connected to the reflective medium and located in the placing recess, the at least one first incoherent light source is connected to the fixing column, and the first condenser lens is arranged above the reflective medium;
   wherein an upper end of the fixing column is provided with a limit protrusion, each of the at least one first incoherent light source comprises a lamp board and at least one lamp bead arranged on the lamp board, the lamp board is opened with an assembly hole adapted to the limit protrusion, the lamp board is fixed on the fixing column through the assembly hole and the limit protrusion, and the lamp board is locked by at least one screw.

11. The projection device of claim 10, wherein the reflective medium is hemispherical, the first driven gear and the reflective medium are integrally formed, and the first driven gear is arranged at a bottom center of the reflective medium.

12. The projection device of claim 11, wherein a periphery of the placing recess is provided with a surrounding wall.

13. The projection device of claim 10, wherein the projection device further comprises a laser assembly, the laser assembly comprises at least one coherent light source and at least one diffraction medium, the at least one diffraction medium is arranged above the at least one coherent light source, and the at least one coherent light source irradiates towards the at least one diffraction medium.

14. A projection device for ambient decoration, comprising a first light-emitting assembly;
   the first light-emitting assembly comprising at least one first incoherent light source, a reflective medium, and a first driving device, an inner surface of the reflective medium consisting of a plurality of irregular reflective surfaces connected to each other, a quantity of the reflective surfaces being 12 or more;
   the first light-emitting assembly further comprising a mount recessed internally to define a placing groove adapted to the reflective medium, a first through-hole and a placing recess on one side of the first through-hole arranged at a bottom of the placing groove, a fixing column arranged in a center of the placing recess, and a second through-hole arranged at a bottom of the reflective medium, wherein the first driving device is arranged in the first through-hole and drivingly connected with the reflective medium, the fixing column passes through the second through-hole into the reflective medium, and the at least one first incoherent light source is connected to the fixing column;

wherein the projection device further comprises a second light-emitting assembly comprising at least one second incoherent light source, a projection base, a second condenser lens, a film sheet and a film sheet pad; the second condenser lens, the film sheet and the film sheet pad are arranged in the projection base, the projection base is provided with a third through-hole, the at least one second incoherent light source passes through the third through-hole, the second condenser lens is arranged above the at least one second incoherent light source, and the film sheet is arranged above the second condenser lens by the film sheet pad.

15. The projection device of claim 14, wherein a first condenser lens is arranged above the first light-emitting assembly, the at least one first incoherent light source horizontally irradiates the reflective medium, and light from the at least one first incoherent light source is reflected by the reflective medium to the first condenser lens and then refracted by the first condenser lens and then emitted.

16. The projection device of claim 15, wherein the projection device further comprises a laser assembly, the laser assembly comprises at least one coherent light source and at least one diffraction medium, the at least one diffraction medium is arranged above the at least one coherent light source, and the at least one coherent light source irradiates towards the at least one diffraction medium.

17. The projection device of claim 16, wherein the projection device further comprises a second driving assembly configured to drive a movement of the laser assembly.

18. The projection device of claim 17, wherein the projection device further comprises a second driving gear connected to the second driving assembly and a second driven gear connected to the at least one diffraction medium, and the second driving assembly is configured to drive the at least one diffraction medium based on cooperation of the second driving gear and the second driven gear.

* * * * *